US005467658A

United States Patent [19]

Buckalew et al.

[11] Patent Number: 5,467,658

[45] Date of Patent: Nov. 21, 1995

[54] ESCALATOR DEFECTIVE ROLLER DETECTOR

[76] Inventors: Robert D. Buckalew, 4296 Drake Ct., Waldorf, Md. 20603; Michael E. Neitzke, 3735 Tanyard Dr., Mechanicsville, Md. 20659

[21] Appl. No.: 358,931

[22] Filed: Dec. 19, 1994

[51] Int. Cl.[6] .......... G01B 5/28

[52] U.S. Cl. .......... 73/865.9; 33/666; 33/523

[58] Field of Search .......... 73/865.9; 198/323; 33/710, 832, 833, 838, 523, 545, 666; 340/686, 689

[56] References Cited

U.S. PATENT DOCUMENTS

| | | | |
|---|---|---|---|
| 3,037,294 | 6/1962 | Graff | 33/523 |
| 3,136,070 | 6/1964 | Keen et al. | 33/523 |
| 5,096,040 | 3/1992 | Wente et al. | 198/323 |
| 5,236,075 | 8/1993 | Bartmann | 198/323 |
| 5,255,771 | 10/1993 | Nurnberg et al. | 198/323 |
| 5,316,121 | 5/1994 | Zaharia et al. | 198/323 |

FOREIGN PATENT DOCUMENTS

| | | | |
|---|---|---|---|
| 0307557 | 6/1988 | European Pat. Off. . | |
| 2027939 | 2/1980 | United Kingdom | 33/666 |

*Primary Examiner*—R. Raevis
*Attorney, Agent, or Firm*—Randy W. Lacasse

[57] ABSTRACT

A portable testing and recording system for detecting defective escalator rollers. The system incorporates a level sensitive detector which actuates an audible, visual and/or marking indicator to alert a repair person to properly identify a defective roller and/or related parts.

16 Claims, 2 Drawing Sheets

ESCALATOR DEFECTIVE ROLLER DETECTOR

BACKGROUND OF THE INVENTION

1. Field of Invention

The present invention relates in general to testing equipment and more specifically to a portable device for the correct testing and marking of escalator step height variations.

2. Discussion of Prior Art

In the field of escalators, an escalator which has good step rollers, good rack axle rollers, and good rack axle hubs, there is no discernable variance of vertical height from the leading edge to the trailing edge of one step to the next. However, in an instance where an escalator step roller has lost diameter surface area, from approximately 1/16" to a maximum of the radius of a roller, improper operation may occur. The danger represented by a bad roller is very clear when considering the meshing of an escalator step with the comb finger sections is dependant on the proper diameter of escalator step rollers and rack axle rollers or rollers related to insuring proper step height at comb area.

The patent to Bartman (U.S. Pat. No. 5,236,075) discloses an escalator broken roller detector 10. The device utilizes proximity sensors 18, 20 in order to detect the diameter of each roller 22. The sensors 18, 20 emit a symmetrical signal which, when interrupted due to a roller 22 falling off its spool 32, will automatically trigger an alarm 38 and an escalator stop switch 40. See FIGS. 1, 2 and col. 2, lines 6–53.

The patent to Wente et al. (U.S. Pat. No. 5,096,040) discloses a device for detecting missing steps in an escalator. The system comprises a detector 12 having a pair of rollers 16 mounted on a carriage 20 that engage a side 28 of the steps 6. The carriage 20 is biased by a spring 42 such that if a step 6 is missing, the carriage 20 moves toward the steps 6 which in turn moves the switch button 34 thus shutting off the power to the escalator. See FIGS. 1, 2 and ABSTRACT.

The patent to Zaharia et al. (U.S. Pat. No. 5,316,121) discloses a system for detecting missing steps utilizing a proximity sensor 26. The system will cause the escalator to stop if the sensor 26 detects a missing or misaligned step 14, 16 by cutting off power to the motor 38 and activating the brake 40. See col. 2, lines 60+.

The patent to Nurnberg et al. (U.S. Pat. No. 5,255,771) disclose a complete safety device 34 that is mounted directly onto the combplate frame 40. See FIG. 2.

In today's escalator maintenance field, defective escalator rollers are typically found in one of the following ways. A maintenance mechanic may provide power to the escalator and walk the escalator, either at the landing (flat) area and step between the leading edge and trailing edge of two consecutive steps on the ball of his or her foot while attempting to "feel" differences in vertical distances as small as 1/16". Generally, this method is unreliable and physically tiring. Another method is to barricade the top and bottom of an escalator and open the top or bottom floor plate and visually inspect each of the rollers. However, unless a mechanic were to put a caliper on each roller, they will most likely not notice a roller which has lost 1/8" of diameter surface area. Most mechanics generally look for "flat" spots on rollers caused by roller bearing defects, which cause the wheel to drag thereby causing excessive wear to the roller. Both of the above described ways of detecting rollers are laborious, time consuming, and unreliable.

Each of the above methods fails to provide a low cost, portable device which will provide an immediate indication to a service repairman of not only that an roller and/or height error exists with one of the steps, but also exactly which step(s) has produced the error.

SUMMARY OF THE INVENTION

The present invention can be attached to an escalator in minutes, is totally self contained, can be attached to the escalators of various manufacturers and is effective in detecting bad step and axle rollers with a loss of 1/16" of diameter surface area or more. The device can further mark the step in question and do all this in a fraction of the time of conventional methods.

The present invention is a device which is attached to the combfinger section of one side, right or left, of an escalator and extends onto the moving steps of the escalator. The device, once attached, gauges vertical differences from one step to another. On detecting a low escalator step the present invention emits an audible tone, actuates a light and marks the low spot on the step in question. The low spot on the step in question will, by location of the mark left on the step, indicate a bad escalator step roller, a rack axle roller, and in instances where the present invention is adjusted to extreme sensitivity may detect bad rack axle hubs. The small thin mark, its intensity indicating the extent of error, will wear off the step during normal traffic use in a relatively short time period or could be wiped off after repair is made.

DETAILED DESCRIPTION OF INVENTION

Figure 1:
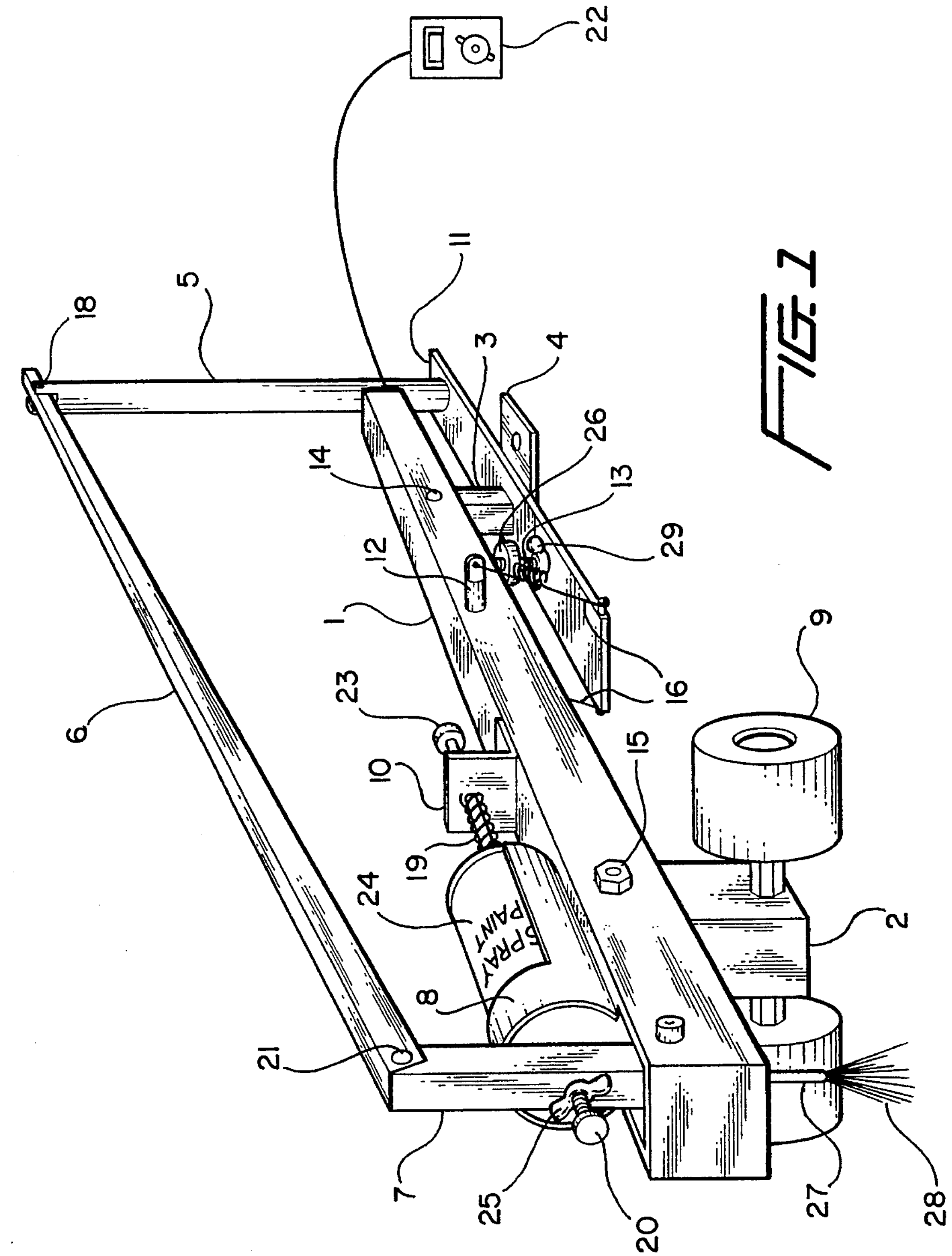
FIG. 1 illustrates a perspective view of the present invention.
Figure 2:
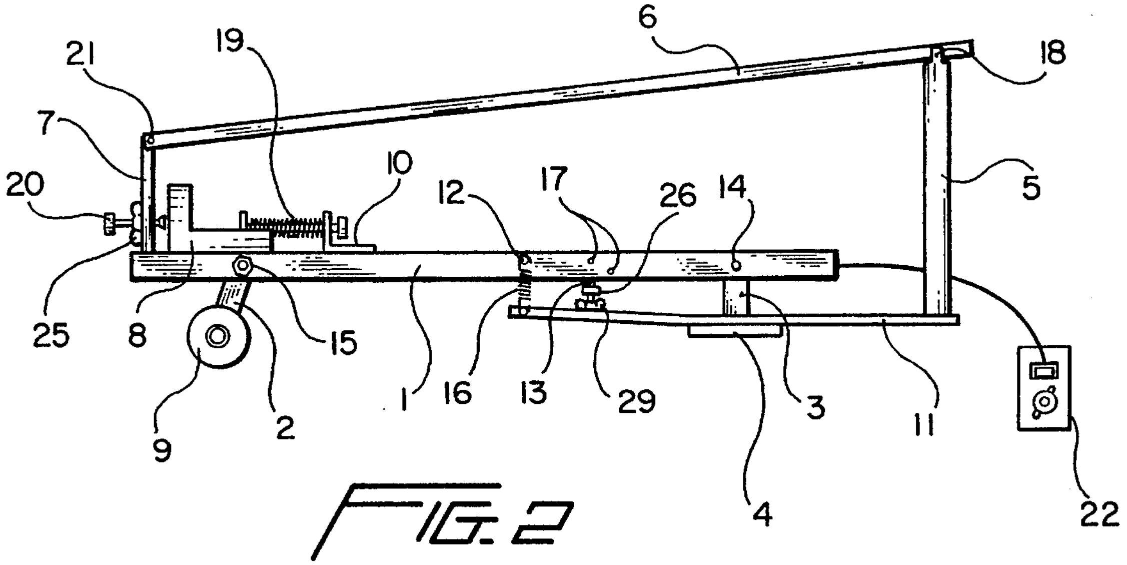
FIG. 2 illustrates a side view of the present invention.
Figure 3:
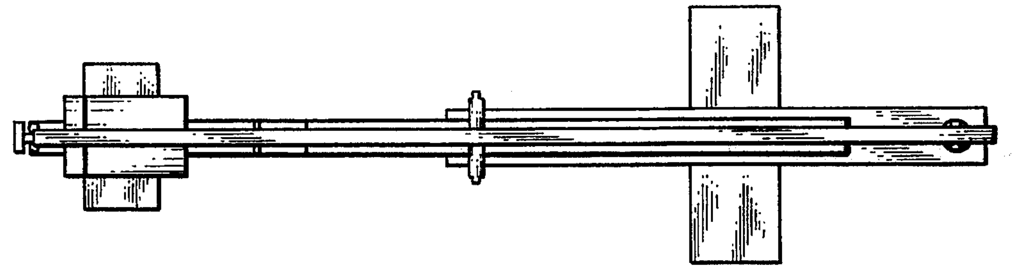
FIG. 3 illustrates a top view of the present invention.

FIG. 1 shows the main body 1 which is a long rectangular beam. The main body 1 is attached to a stationary pedestal 3 by pivot pin 14. The stationary pedestal 3 is attached to platform 11, and the combfinger thru-bolt plate 4. The main body 1 is a pivoting boom which rides the step surfaces by attachment of the step surface rollers 9 and axle pedestal 2 by bolt 15. Tensioner springs 16 are attached to the platform 11 by the main body spring retainer 12. A spray actuating pedestal 5 is attached to the platform by a 3/8"×1" bolt and lock washer (not shown). Spray actuating arm 7 is attached to the main body 1 with a 8/32"×1¼" allen bolt (not shown). The spray linkage arm 6 is then attached to spray actuating pedestal 5 and spray actuating arm 7 by pivot pins and cotter pins 18 & 21. A spray can saddle 8 and paint can load device bracket 10 are attached to main body 1 with (¼×¼" steel rivets). The paint can load device 19 is attached to bracket 10. A spray adjustment screw 20 is screwed into spray actuating arm 7 through a 10/32" threaded hole. Sensor adjustment screw 13 is attached to platform 11 by screwing into a 8/32"×5/16" tapped hole (not shown) in the platform.

Figure 4:
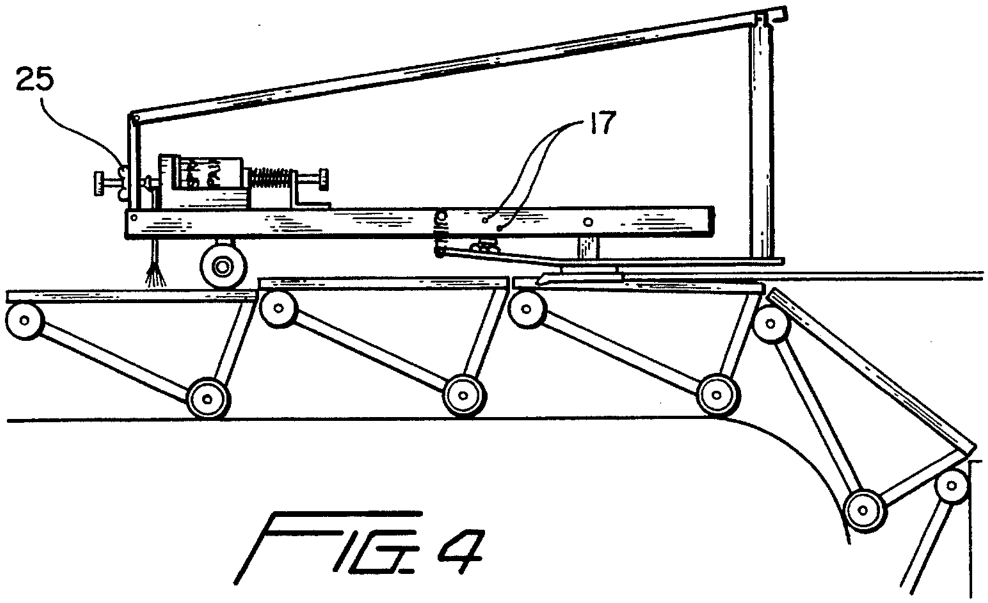
FIG. 4 illustrates the present invention marking a selected escalator step.

In operation the device operates as follows:

First, remove bolts/screws from the combfinger section nearest to skirt pane (side) of escalator to be tested. Next, a visual and/or manual inspection of the closest step to the escalators platform should be performed to accurately calibrate the testing unit. A first step should be chosen that is within a 1/16" error in vertical height displacement then position this step under the wheels 9. With bolts provided and combfinger section still in place, the testing device is attached to one side of an escalator, through combfinger thru-bolt plate 4. Defective roller sensory device 22, which provides audible and visual indications, is actuated to monitor the testing procedure. The microswitch connection of element 22 (17) is mounted inside element 1 and actuated by element 13 upon 1 moving downward. Sensor adjustment screw 13 is adjusted upwards toward the underside of the main body 1 until a light emitting diode is activated and a tone sounds from defective roller sensory device 22. Then the sensor adjustment screw 13 is reversed using knob 26 until the light goes out and the tone stops sounding then the sensor locking wing nut 29 is secured. A spray can 24 (FIG. 4) is installed in the spray can saddle 8 with its nozzle tube 27 pointed downwardly through a hole (not shown) in the main body 1. The can is inserted and secured by pulling back on the knob 23 provided on the paint can load device 19 and released against the can of spray paint. Then, with paper or rag under spray tube, the user adjusts the spray adjustment screw 20 until spray begins, then reverses the screw 20 until spray stops and then locks wing nut 25. Now the escalator may be started. Please note that the stair unit should always be run in an up direction when the test unit is mounted at the bottom of the escalator. When the escalator is running and a low spot is detected, the device will sound tone and/or light indicators on the defective roller sensory device 22 and make a spray mark (FIG. 4) on the low spot of the step by vertical displacement of wheel 9 actuating a mechanical coupling of elements as follows: element 1 will pivot downward through elements 14 and 3; element 11, being a stable non-moving platform creates a geometrical coupling of elements 7 and 6 and 5 to then cause the spray actuator 20 to press on spray can nozzel and spray from the can 24 paint downwardly directed through the nozzle 27 creating mark 28.

Appendix A

| Element | | |
|---|---|---|
| 1 | Main Body | |
| 2 | Axle Pedestal | supports wheel axle and attaches to main body |
| 3 | Stationary Pedestal | supports main body to platform, acts as pivot |
| 4 | Comb Finger Section thru Bolt Plate | is used to attach to various escalators |
| 5 | Spray Actuating Pedestal | attaches to platform and provides point of action for spray section |
| 6 | Spray Linkage Arm | extends from 5 to 7 to transfer action provided by movement of main body |
| 7 | Spray Actuating Arm | adjustable link for spray action |
| 8 | Spray Can Saddle | supports spray can |
| 9 | Step Surface Rollers | rides step surface |
| 10 | PCLD Bracket | bracket supports spring loaded can holding device |
| 11 | Platform | Platform is used as a stable variance of spray action, 22 adjustment, and support |
| 12 | Main Body Spring Retainer | holds tensioner springs in place to main body |
| 13 | Sensor Adjustment Screw | adjusts sensitivity of vertical step variance |
| 14 | Main Body Pivot Pin | |
| 15 | Axle Pedestal to Main Body Bolt | |

-continued

Appendix A

| Element | | |
|---|---|---|
| 16 | Tensioner Springs | creates down pressure on step surface |
| 17 | Micro Switch Screws | used to mount micro switch to main body |
| 18 | SLA to SAP Pivot Pin | |
| 19 | Paint Can Load Device | spring pressured device which holds spray can firmly against 8 |
| 20 | Spray Adjustment Screw | used to adjust spray |
| 21 | SLA to SAA Pivot Pin | |
| 22 | Defective Roller Sensory Device (Electronic Section) | device which is used to give visual and audible signal that the testing device has detected a bad step and also is used to initially set up sensitivity and "bottom" |
| 23 | Adjustment Knob - Paint Can Load Device | used to adjust - 19 |
| 24 | Paint Can | marks step |
| 25 | Wing Nut | Locks 20 |
| 26 | Adjustment knob | adjusts 13 |
| 27 | Nozzle Tube | spray can attachment |
| 28 | Spray paint mark | result of sprayed paint |
| 29 | Wing nut | locks 13 |

CONCLUSION

A system and method has been shown in the above embodiments for the effective implementation of a portable device for the testing and recording of errors of vertical height or depth found in steps of escalators. While various preferred embodiments have been shown and described, it will be understood that there is no intent to limit the invention by such disclosure, but rather, is intended to cover all modifications and alternate constructions falling within the spirit and scope of the invention as defined in the appended claims.

The testing unit of the present invention may be used with any combination of the audible, visual and/or marking indicators or equivalents thereof to indicate a repair is needed. In addition the device may be used to test either side of a perspective escalator or may be modified, within the spirit of the specification, to simultaneously test both sides.

The device should not be limited by materials composition, size and/or specific connection details. The device could further use known equivalent motion detection system, attachment methods and/or marking methods without departing from the spirit and scope of the present invention. The device could be permanently built in to the escalator system itself.

The device should not be limited to the escalator art but could be used to test any equivalent structures (e.g. people movers, conveyor belts and the like.).

We claim:

1. A portable escalator testing device comprising:

a framework support means;

a step level detection means for detecting a change in vertical level of an escalator step;

a marking means operatively connected to said framework support means;

an indicator means operatively connected to said framework support means;

said framework support means supporting both said step level detection means and said marking means, and wherein a detected change in said vertical level of said escalator step within a predetermined range actuates said indicator and/or marking means.

2. A portable escalator testing device as per claim 1, wherein said framework means comprises a long horizontal support means, escalator attachment means, roller means and marking actuation means.

3. A portable escalator testing device as per claim 2, wherein said step level detection means is implemented by an interaction of said roller means, said long horizontal support means and an associated spring mounted deflector plate.

4. A portable escalator testing device as per claim 1, wherein said marking means is a spray paint can.

5. A portable escalator testing device as per claim 1, wherein said framework means further comprises a semi-encapsulating support means for removably securing a spray paint can.

6. A portable escalator testing device as per claim 1, wherein said framework means further comprises a long horizontal support means, escalator attachment means, roller means, marking actuation means, associated spring tensioner and a semi-encapsulating support means for removably securing said marking means.

7. A portable escalator testing device as per claim 6, wherein said framework means further comprises adjustment means for said step level detection means and said marking actuation means.

8. A portable escalator testing device as per claim 1, wherein said indicator means includes an audible and visual indicator for indication of a change in level beyond said predetermined range.

9. A portable escalator testing device for testing escalator step height malfunctions comprising:

a support framework means;

a step level detection means for detecting a change in vertical level of an escalator step;

a spray paint can holder and actuator;

an indicator means including audible and/or visual indicators;

said framework support means supports both said step level detection means, said spray paint can holder and actuator, and wherein a detected change in said vertical level of said step within a predetermined range actuates said spray can actuator and/or said audible and/or visual indicators to indicate an escalator in need of repair.

10. A portable escalator testing device as per claim 9, wherein said framework means comprises a long horizontal support means, escalator attachment means and roller means.

11. A portable escalator testing device as per claim 10, wherein said step level detection means is implemented by an interaction of said roller means, said long horizontal support means and an associated spring tensioner.

12. A portable escalator testing device as per claim 9, wherein said framework means further comprises a long horizontal support means and wherein an escalator attachment means, roller means, and an associated spring mounted deflector plate are all operatively connected thereto.

13. A portable escalator testing device as per claim 9, wherein said framework means further comprises adjustment means for said step level detection means and said spray paint can actuator.

14. A method for the testing and marking of escalator steps comprising:

securing a portable testing unit to a platform of said escalator;

calibrating said portable testing unit with respect to a first step of said excalator steps;

using said portable testing unit to detect a vertical height variation of each of said steps starting with said calibrated first step;

determining a vertical height variation which is outside a predetermined range, and actuating a marking means to identify each step outside of said predetermined range.

15. A method for the testing and marking of escalator steps as per claim 14, wherein said marking means is a pressurized spray paint means.

16. A method for the testing and marking of escalator steps as per claim 14, wherein said actuation step further includes sounding an audible and/or visual indication.

* * * * *